United States Patent [19]
Leger

[11] Patent Number: 6,061,464
[45] Date of Patent: May 9, 2000

[54] FINGERPRINT-READING SYSTEM WITH INTEGRATED HEATING RESISTORS

[75] Inventor: François Leger, St Martin D'Heres, France

[73] Assignee: Thomson-CSF, Paris, France

[21] Appl. No.: 08/960,360

[22] Filed: Oct. 29, 1997

[30] Foreign Application Priority Data

Nov. 5, 1996 [FR] France .................................. 96 13453

[51] Int. Cl.$^7$ ...................................................... G06K 9/00
[52] U.S. Cl. ............................................................. 382/124
[58] Field of Search .................. 382/115–116, 124–127; 340/825.34; 356/71; 345/173–174; 902/3–6; 235/379–362.5; 73/862.046

[56] References Cited

U.S. PATENT DOCUMENTS

| | | | |
|---|---|---|---|
| 4,353,056 | 10/1982 | Tsikos ..................................... | 382/124 |
| 4,358,677 | 11/1982 | Ruell et al. ............................. | 382/124 |
| 4,394,773 | 7/1983 | Ruell ..................................... | 382/124 |
| 4,429,413 | 1/1984 | Edwards ................................. | 382/124 |
| 4,577,345 | 3/1986 | Abramov ................................ | 382/124 |
| 4,582,985 | 4/1986 | Lofberg ................................. | 382/124 |

FOREIGN PATENT DOCUMENTS 2 674 051 9/1992 France .
WO 96/32061 10/1996 WIPO .

*Primary Examiner*—Bhavesh Mehta
*Attorney, Agent, or Firm*—Oblon, Spivak, McClelland, Maier & Neustadt, P.C.

[57] ABSTRACT

A fingerprint-reading system including a sensor on which a finger, whose imprint is to be read, is pressed. The sensor has an active surface of elements sensitive to variations in temperature and integrated heating resistors that create a transient variation in the temperature of the sensitive elements thereby to generate temporary charges in each element when pressed by a finger. The charges are output in synchronism with creation of the transient variations in the temperature of the sensitive elements to provide stable images of the fingerprint which may be motionless. The output of the sensor enables real-time display of the fingerprint images and processing of authentication data. The heating resistor enables the sensor to produce stable images of a fingerprint by producing an internal excitation to offset the tendency of electrical charges, induced by variations of the physical temperature of the finger, from disappearing because the temperature of the finger has reached equilibrium.

11 Claims, 2 Drawing Sheets

FINGERPRINT-READING SYSTEM WITH INTEGRATED HEATING RESISTORS

BACKGROUND OF THE INVENTION

1. Field of the Invention

The invention relates to finger-print reading systems used especially in devices for authenticating individuals.

2. Description of the Prior Art

The many systems used to authenticate individuals, based on fingerprint analysis, comprise at least one sensor used to obtain an image of the fingerprint of the individual to be identified. In presently used systems, the finger is placed on the sensor whose reading surface must necessarily have a size equal to about the size of the finger. The sensor is associated with a system of analysis used to compare the image of the fingerprint that it gives with an image of a reference fingerprint stored in an appropriate medium, for example a chip card.

In most cases, the sensors give an analog type of information element and the analysis system makes use of an operation for the digital processing of the image of the fingerprint which must be digitized at output of the sensor by means of an analog-digital converter. In certain structures, the sensor delivers the digitized image directly.

Fingerprint-reading systems are often based on the use of optical devices such as a video camera picking up the image of the finger but it is possible, with a simple photograph of the same finger, to obtain the same image at output of the camera and thus defraud the system. To overcome this drawback, certain systems use prisms or microprisms in order to ascertain that it is really a genuine finger and not a photograph that is being placed before the sensor, the light being reflected only at the places where the lines of the fingerprint do not touch the prism. A photograph thus becomes inoperative. However, the optical systems cannot be used to ascertain that the finger which has been placed before the sensor is truly a live finger and is not for example a molded finger. The optical systems have other drawbacks such as for example their great volume and high cost of production.

Other means have been proposed to make devices for the authentication of individuals by means of fingerprints, making use of the batch-processing possibilities of the semiconductor industry. Devices made in this way are potentially less costly and offer the advantages of the integration of the sensor and of all or a part of the data-processing sequence of the authentication device, especially the operations of image digitizing at output of the sensor, the storage of the reference image and authentication. The fingerprint-reading sensor has a matrix of sensitive elements organized in rows and columns, giving an electric signal that differs depending on whether a ridge of the fingerprint line touches or does not touch a sensitive element of the sensor.

Patents have been filed on various means of reading fingerprints:

The U.S. Pat. No. 4,353,056 describes a principle of reading based on the variation of the capacitance of the sensitive elements of the sensor.

Other systems comprise sensors having components sensitive to pressure, temperature or else to pressure and temperature, converting the spatial information on pressure and/or temperature into an electric signal that is then collected by a semiconductor-based multiplexer which may for example be a CCD matrix. The U.S. Pat. No. 4,394,773 describes a principle of this kind.

The sensors based on the piezoelectric and/or yroelectric effects are the most valuable for they are sensitive to the pressure and/or to the heat exerted on their sensitive elements. This feature makes it possible to ascertain, during the reading of fingerprints, that the finger is truly part of a living individual, through the inherent heat that it releases. It is also possible to detect the variations due to the pulsating flow of blood in the finger, inducing a variation of heat and/or pressure, thus providing for greater reliability in the authentication of the fingerprint.

The electric signal given by the sensors integrated into a semiconductor substrate has the drawback of being short-lived and a specific system is necessary to maintain it in time. The signal is short-lived because the electric charges are induced by variations of the physical effects (temperature, pressure, etc.) on the sensor. As a consequence, the signal at its output tends to disappear when the physical effects are brought into equilibrium. The time constants of disappearance of the signal are in the range of some milliseconds to some seconds in the more favorable cases.

The practical result of this is that a series of images is produced starting from the time when the finger is placed on the sensor. The quality of contrast of these images is not stable, and they tend to fade away. This complicates the task of the recognition system for it is then necessary to analyze all the images that are being constantly produced by the sensor in order to find the one most suitable for authentication.

Systems with excitation external to the sensor have been proposed. These are, for example, systems for sending an energy beam in the form of microwaves. However, they complicate the system and increase its volume and cost.

It is possible to mitigate the effects of the disappearance of the image of the fingerprint by means of an electronic memory. However this complicates the designing of the sensor and increases its cost of manufacture for it requires technology that enables memory storage. It is very difficult to build a system that is sufficiently precise, reliable and inexpensive, and capable of deciding which is the best image among all those produced by the sensor.

SUMMARY OF THE INVENTION

The present invention proposes to mitigate the drawbacks of the prior art by proposing a fingerprint-reading system comprising a sensor having a matrix of sensitive elements and a multiplexer, enabling the individual measurement of the electric charges generated by a transient phenomenon in the sensitive elements of the matrix, the matrix being encapsulated in a package that is open on one of its faces to enable a finger to be pressed on the matrix, the matrix providing electric signals corresponding to a matrix pattern constituting a total image of the fingerprint, wherein the sensor comprises means to create a transient internal thermal variation of the matrix of sensitive elements, the system comprising means to read the signals of the matrix after application of this thermal variation.

This variation in local temperature of the sensor has the effect of creating a local charge in the pyrolectric material of the sensor.

A fingerprint takes the form of a set of lines on the skin, comprising lines of ridges and hollows. When the region of the finger comprising this fingerprint is pressed on the matrix of heated sensitive elements of the sensor, the presence of the ridges of the fingerprint in contact with the sensitive elements leads to a more efficient dissipation of the heat from these elements than does the presence of the hollows of this very same fingerprint.

The dissipation of this heat and therefore the variation of the temperature of each sensitive element is thus greater or smaller depending on the presence, on these sensitive elements of the sensor, of the ridges or hollows of the fingerprint. This phenomenon creates a spatial modulation of the thermal variations in the pyroelectric layer and therefore a spatial modulation of the charges collected by the multiplexer. The fact that the finger is motionless, and that the reading of the charges is done sequentially results in the production, by the reading system, of a stable image. The rise in temperature of the pyroelectric layer remains small, below about one degree Kelvin.

The transient local variation in temperature of the sensitive elements is obtained by means of a heating resistor placed in contact with the matrix of sensitive elements. This heating resistor is traversed by a transient current for the heating of the sensor working in synchronism with the reading of the charges by the multiplexer. This transient current raises the temperature locally by dissipation of the electrical power by Joule effect.

In a first embodiment, the matrix of sensitive elements is organized in rows and the sensor then comprises as many heating resistors as there are rows of sensitive elements. Each heating resistor, associated with its respective row, is parallel to this row in order to heat it. The multiplexer reads the charges of the sensitive elements row by row. Each row is read in succession and is reset at zero. The heating current is injected into each resistor associated with a row, for example just after the reading of the row or during the resetting of the electric charges of the pyroelectric capacitors. The image of the total fingerprint is reconstituted by the system.

In another embodiment, only one heating resistor is used to heat all the sensitive elements of the matrix. This single resistor, in the shape of a serpentine coil, traverses the entire surface of the sensor in passing between the sensitive elements in order to heat them. After the injection of the current into the resistor, the charges of the capacitors of the sensitive elements represent the full image of the fingerprint. This image is frozen by the storage of the charge created in each sensitive element of the matrix, and then the image is read sequentially to reconstitute the full image of the fingerprint. The current can be injected into the resistor, for example, during the sequential reading of the image.

It is also possible to envisage a case where the reading of the sensitive elements is done element by element. This requires an addressing in rows as well as in columns, and requires one resistor per element.

Another aspect of this invention lies in the possibility of carrying out an automatic test of the accurate operation of each sensitive element of the matrix without using, for example, temperature sources and/or pressure sources that are external to the system and are applied to the sensor. Indeed the transient heating of the sensitive elements of the sensor by the resistor, or the resistors integrated into the sensor, creates short-lived charges in the capacitors of the sensitive elements which make it possible to ascertain, by the checking of these charges, that each sensitive element of the matrix is working properly.

BRIEF DESCRIPTION OF THE DRAWINGS

Other features of the invention shall appear from the detailed description of the following embodiments, this description being made with reference to the appended drawings, of which.

MORE DETAILED DESCRIPTION

Figure 1:
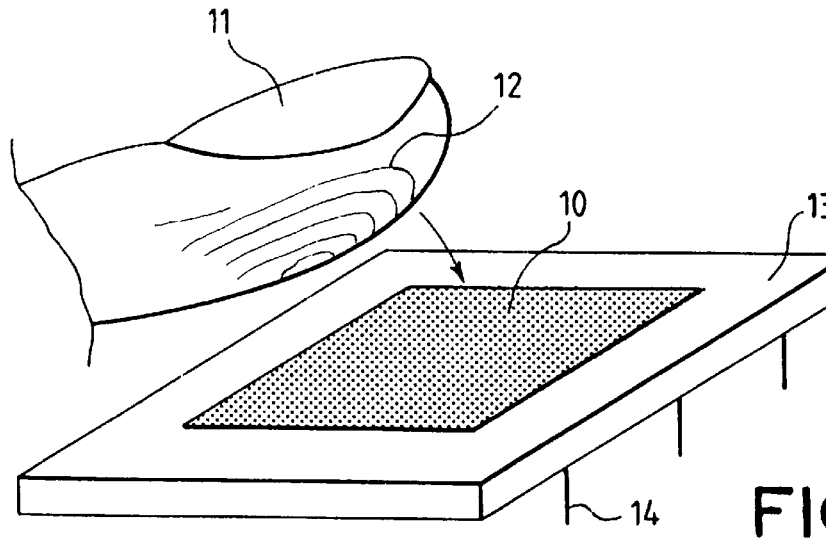
FIG. 1 shows a general view of the fingerprint sensor.

FIG. 1 shows a general view of a fingerprint sensor comprising heating resistors. The fingerprint sensor 10 is an integrated circuit having a rectangular shape with a size sufficient to carry out the reading of the fingerprint. The integrated circuit comprises a matrix of sensitive elements formed by an active pyroelectric layer placed between an upper electrode and a matrix array of lower electrodes. The lower electrodes lie on a semiconductor substrate in which there is formed an integrated electronic circuit capable of processing the electric charges generated by the pyroelectric layer on each of the electrodes of the array. This integrated circuit is contained in a support 13 connected by connection pins 14 that transmit electric signals outside the sensor, all these electric signals representing an image, at a given time, of the temperature pattern of the active pyroelectric layer. The constitution of the lower electrodes in the form of a matrix array makes it possible to obtain an array of individual pyroelectric sensitive elements even if the pyroelectric layer is continuous.

Figure 2:
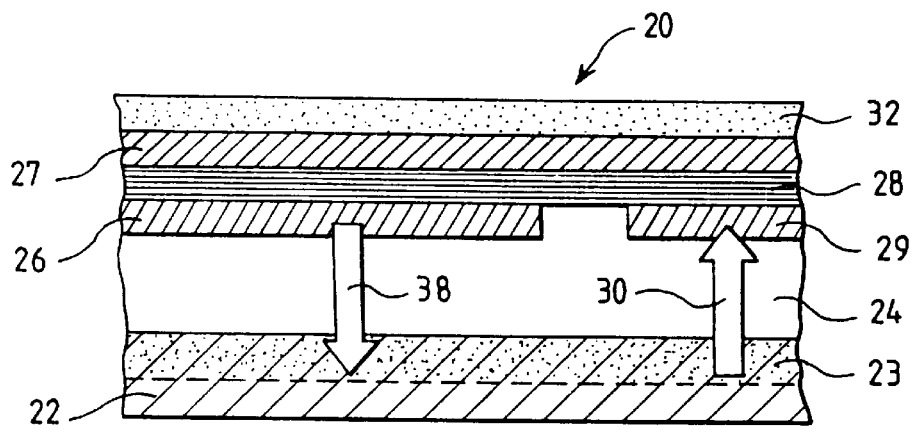
FIG. 2 is a diagrammatic sectional view of the constitution of the sensor in the zone of a sensitive element.

FIG. 2 gives a schematic view of a part of an integrated circuit 20 in the zone of a sensitive element of the sensor comprising a heating resistor 29 in the vicinity of this sensitive element.

The integrated circuit comprises:

a semiconductor substrate 22 which, in principle, is a silicon substrate. On this substrate there are formed circuits for the processing and reading of electric charges. These circuits constitute the multiplexer 23. These circuits are for example CCD (charge-coupled devices or charge-transfer circuits), or CMOS circuits. They are made according to current technologies for the manufacture of silicon integrated circuits. The circuits are constituted in an array, as a function of the matrix pattern of pyroelectric elements that will be formed subsequently.

a heat insulator 24 deposited on the substrate.

pyrolectric capacitors constituted by a lower metal plate 26 and an upper metal plate 27, between which there is located a layer 28 of pyroelectric material. The upper metal plate 27 is common to all the capacitors of the sensitive elements and may be perforated (reticulate) in order to limit the lateral propagation of heat. The lower metal plate 26 is connected to an access 38 of the multiplexer 23, carrying out the reading of the charges of the capacitors. The heating resistor 29 is made at the same level as the lower electrode 26 and is connected, by an access 30, to a transient current generator of the multiplexer 23.

a thin protection layer 32, deposited on the sensitive elements, whose heat propagation must be essentially perpendicular to the plane of the sensor in order to limit the lateral diffusion of heat.

The material of the pyroelectric layer may be, for example a polyvinylidene fluoride (PVDF), a polyvinylidene fluoride-trifluoroethylene (PVDF-TrFE), a polyvinylidene cyanide-vinylacetate (PVDCN-VAc) or a polyvinylidene cyanide-vinylidene fluoride (PVDCN-VDF). Other types of sensitive layers are possible, in particular all those that produce electric charges as a function of a pyro-piezoelectric parameter.

In the case of the above-mentioned copolymers, the principal effect used is the generation of the electric charges induced by the variation in the temperature of the copolymer.

Figure 3:
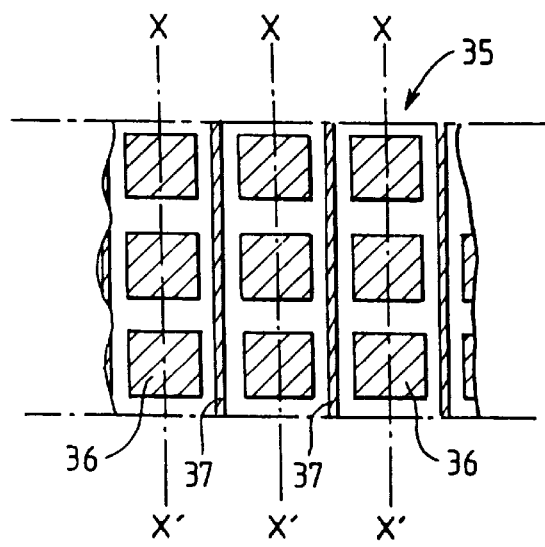
FIG. 3 shows an exemplary embodiment of the heating resistors.

FIG. 3 shows a partial view of an integrated circuit 35 at the plane of the lower plates 36 of the pyroelectric capacitors and the heating resistors 37, located on the same plane of the integrated circuit. The heating resistors 37 traverse the integrated circuit, between the rows with an axis XX' of the lower plates of the pyroelectric capacitors, and are parallel to these rows. The heating resistors 37 are made by the deposition, for example of titanium, at the same time as the lower metal plates 36 of the pyroelectric capacitors.

In the case of row-by-row reading, a resistor is associated with a row of sensitive elements. In the case of the reading of a full image, only one resistor is associated with all the sensitive elements of the sensor.

Figure 4:
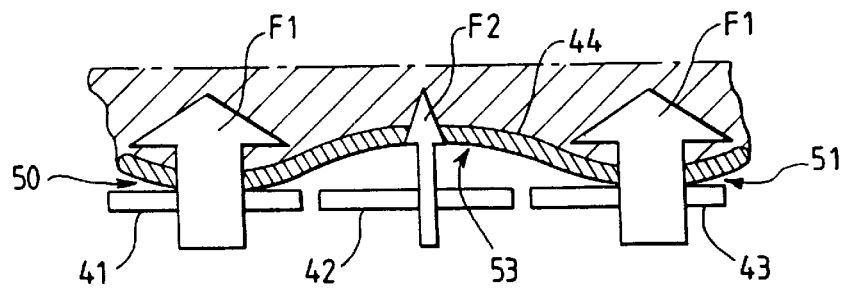
FIG. 4 shows the heat dissipation of the sensitive elements by the fingerprint.
Figure 5:
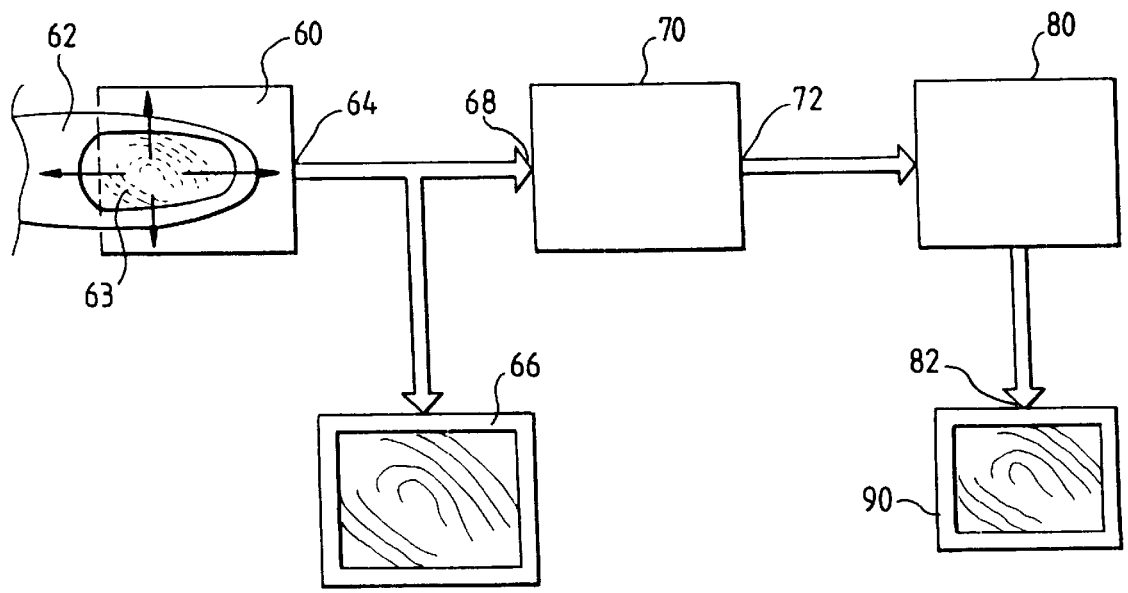
FIG. 5 is block diagram of a fingerprint-reading system according to the invention.

FIG. 4 gives a schematic view of a set of contiguous sensitive elements 41, 42, 43, on which there presses a part of a finger corresponding to a part of the fingerprint 44. A magnified surface of this fingerprint is shown in FIG. 4. At this position, the fingerprint has two ridges 50 and 51 and one hollow 53. The ridges 50 and 51 are respectively in contact with the sensitive elements 41 and 43 while the hollow 53 is not in contact with the sensitive element 42. During the transient heating of the sensitive elements, the heat flow F1 dissipated by the finger pressed on the sensor is greater on the sensitive elements 41 and 43 in contact with the respective ridges 50 and 51 than the heat flow F2 dissipated by the sensitive element 42 which is not in contact with the finger due to the presence of the hollow 53 of the fingerprint. This fact, during the transient thermal variation produced by the passage of the current in the heating resistor, creates a spatial variation in temperature in the sensitive elements and therefore a spatial variation, which corresponds exactly to the thermal variation, of the charges in the pyroelectric capacitors.

A description shall be given here below of an exemplary embodiment of a fingerprint-reading system according to the invention, comprising means for the display and processing of images of fingerprints provided by a sensor with heating resistors and having a surface area equal to about the size of a fingerprint that is to be read.

The system comprises a sensor 60 as described here above. The sensitive elements of this sensor 60 are heated in a transient way by one or more heating resistors. On the pyroelectric surface of the sensor 60, there is supported a motionless finger 62 having a fingerprint 63. The sensor 60 provides an analog signal representing the image of the fingerprint 63 at an output 64. The output 64 of the sensor is connected firstly to a videofrequency terminal 66 comprising a screen for the display of the images of the fingerprint and, secondly, to an analog input 68 of an analog/digital converter 70. A digital output 72 of the converter 70 is connected to an input of a digital memory 80. The output of this memory is connected to a digital input 82 of a processing and computation system, for example a microcomputer 90.

Each analog image generated by the sensor 60 is displayed on the screen of the videofrequency terminal 66, which enables a real-time assessment of the quality of the images provided constantly by the sensor 60. The finger 62 can be shifted slightly on the pyroelectric surface of the sensor in order to find the best image of the fingerprint 63, the rate of travel of the finger being limited in order to be compatible with the frequency of the images at output of the sensor.

In this first phase, the image of the fingerprint is simply displayed on the videofrequency terminal 66, without an acquisition of the image of the fingerprint by the system. The videofrequency terminal 66 comprises a known system of adaptation, not shown in the figure, by which the analog signal can be converted at output of the sensor into a videofrequency signal capable of being displayed by a standard videofrequency screen.

When the image is considered to be satisfactory, the image is acquired and digitized on a number N of bits by the analog-digital converter 70. The digitized image provided by the converter 70 is stored in the digital memory 80 at a relatively high speed of some megahertz. This digital memory 80 is of a modest size, corresponding approximately to the product of the number of sensitive elements of the sensor multiplied by the number of bits N to encode the level of each sensitive element.

The digitized image stored in the digital memory 80 is then transmitted to the microcomputer 90, at a speed lower than the speed of storage in the memory, in the range of some hundreds of kilohertz, compatible with the input speeds permitted by the digital inputs (parallel port or serial port) of the microcomputer 90.

The system that is the object of this invention does not require any image-reconstruction algorithm. However, the image stored in the microcomputer 90 is first of all processed by known methods to improve its quality. Then it is processed to extract information useful for the recognition of the fingerprint. A search algorithm makes it possible to authenticate the stored fingerprint by comparing it with a prerecorded fingerprint image corresponding to an individual to be authenticated. These shape-recognition algorithms may use, for example, processing operations for the extraction of contours, contour-vectorizing operations or other types of processing operations. The useful image of a fingerprint is in fact a set of contours corresponding to the ridges and to the hollows of this fingerprint. For the authentication, the sets of the contours detected will be compared with sets of prerecorded contours corresponding to an individual to be authenticated. The sets of the contours could then be stored in the forms of tables of vectors describing these contours.

What is claimed is:

1. A fingerprint-reading system, comprising:

sensor configured to provide electrical output signals corresponding to an image of a fingerprint, comprising, a matrix of sensitive elements configured to produce respective temporary electrical charges in response and in spatial relation to contact of a finger, a heating resistor configured to create a transient thermal variation in said matrix of sensitive elements so that the temporary electrical charges are produced in said sensitive elements upon creation of the transient thermal variation; and a read-out mechanism synchronized with creation of the transient thermal variation and configured to produce said output signals corresponding to said respective temporary electrical charges produced in spatial relation to contact of the finger;

wherein said heating resistor is configured to create said transient thermal variation of said matrix of sensitive elements by placing said heating resistor in contact with said matrix of sensitive elements, such that said heating resistor is traversed by a transient current in synchronism with said readout mechanism producing said output signals.

2. The fingerprint-reading system of claim 1, wherein said transient thermal variation creates a spatial variation of said electrical charges collected by differences in heat conduction between hollows and ridges of lines of the fingerprint in contact with said matrix of sensitive elements.

3. The fingerprint-reading system of claim 1, wherein said matrix of sensitive elements is organized in rows, said sensor comprises as many heating resistors as there are rows, and each heating resistor corresponds to a respective row such that said sensor is configured to measure electrical charges of row after heating a corresponding heating resistor.

4. The fingerprint-reading system of claim 3, wherein said sensor is configured to measure said electrical charges of a row of said matrix of sensitive elements after heating said corresponding heating resistor such that a full image of the fingerprint is represented.

5. The fingerprint-reading system of claim 1, wherein said sensor comprises only a single heating resistor, such that said single heating resistor corresponds to every element of said matrix of sensitive elements.

6. The fingerprint-reading system of claim 1, wherein said sensor comprises as many heating resistors as there are sensitive elements of said matrix of sensitive elements, such that each heating resistor corresponds to a sensitive element of said matrix of sensitive elements.

7. The fingerprint-reading system of claim 1, wherein said matrix of sensitive elements comprises an inner layer of pyrolectric polymer and outer layers of electrodes.

8. The fingerprint-reading system of claim 1, wherein said heating resistor is made at the same time as the lower metal plates of the pyrolectric capacitors by metal deposition.

9. The fingerprint-reading system of claim 1, further comprising a digital output for displaying and processing the images provided by said sensor.

10. The fingerprint-reading system of claim 1, wherein said sensor is configured to authenticate an individual by comparing an image produced by said sensor with a prerecorded image corresponding to the individual to be authenticated.

11. The fingerprint-reading system of claim 1, wherein said sensor is configured to test the efficiency of each sensitive element of said matrix of sensitive elements by heating said sensitive elements.

* * * * *